United States Patent
Cui

(10) Patent No.: US 8,472,777 B2
(45) Date of Patent: Jun. 25, 2013

(54) OPTICAL FIBER ACCESS TERMINAL AND ITS OPTICAL FIBER INTERFACE PROTECTIVE CAP

(75) Inventor: Changjiang Cui, Shanghai (CN)

(73) Assignee: CIG Shanghai Co., Ltd., Shanghai (CN)

( * ) Notice: Subject to any disclaimer, the term of this patent is extended or adjusted under 35 U.S.C. 154(b) by 83 days.

(21) Appl. No.: 13/084,569

(22) Filed: Apr. 12, 2011

(65) Prior Publication Data

US 2012/0263426 A1  Oct. 18, 2012

Related U.S. Application Data

(63) Continuation of application No. PCT/CN2009/070169, filed on Jan. 16, 2009.

(51) Int. Cl.
*G02B 6/00* (2006.01)
*G02B 6/26* (2006.01)
*G02B 6/36* (2006.01)

(52) U.S. Cl.
USPC .............. 385/136; 385/15; 385/31; 385/39; 385/53; 385/139

(58) Field of Classification Search
USPC ............ 385/14, 15, 31, 38, 39, 53, 134, 136, 385/139
See application file for complete search history.

(56) References Cited

U.S. PATENT DOCUMENTS

2008/0273854 A1* 11/2008 Hendrickson et al. ........ 385/135
2010/0310226 A1* 12/2010 Wakileh et al. ............... 385/139

* cited by examiner

*Primary Examiner* — Kaveh Kianni
*Assistant Examiner* — Hung Lam
(74) *Attorney, Agent, or Firm* — Perkins Coie LLP; Aaron Wininger

(57) ABSTRACT

This invention relates to an optical fiber access terminal and its terminal parts, specifically to an optical fiber interface protective cap for the terminal body. An optical fiber access terminal includes a terminal body and a protective cap. The terminal body provides an incision from which an optical fiber splice is exposed. The protective cap covering the incision includes a front end, a rear end, an upside, an underside, a right side and a left side portion. The front end portion has a wire outlet through which an optical fiber passes. The rear end portion has an opening receiving the optical fiber splice. The left side portion has a clamping part clamped with the terminal body. The front end, the rear end, the upside, the underside, the right side and the left side portion make a cavity in which the optical fiber and the optical fiber splice are connected.

12 Claims, 6 Drawing Sheets

OPTICAL FIBER ACCESS TERMINAL AND ITS OPTICAL FIBER INTERFACE PROTECTIVE CAP

This application is a continuation of PCT/CN2009/070169 filed Jan. 16, 2009.

SUMMARY OF THE TECHNOLOGY OF THE INVENTION

This invention relates to an optical fiber access terminal and its terminal parts, and in particular, relates to an optical fiber interface protective cap for the terminal body.

Background Technology

Optical access equipment, such as GPON, EPON, and a variety of fiber optic Ethernet network devices, generally requires protection of the optical fiber interface not only from dust at the fiber optic connector, but also to prevent a user from accidentally detaching the optical fiber connector, creating safety issues. One method used to protect the optical interface is a front end cover, composed of an upper side portion and two side portions perpendicular to the upper side portion, which covers the front portion of the terminal housing. The fiber access terminal housing provides an exposed fiber optic connector incision so that the protective cap snaps or attaches to the incision, with the protective cap covering the incision and the fiber optic connector. The incision is further protected by the terminal housing interior wall opposite the cover with the fiber entering from the end of the protective cap. The mounting hole through which the fiber optic connector is attached is restricted because of the retaining wall of the incision and the protective cap side sections, such that the protective cap mounting space is restricted. This results in limited space for the installation of optical fiber and fiber optic connector, which ultimately makes the installation of the protective cap very inconvenient.

Invention Content

The purpose of this invention is to provide an optical fiber access terminal with an optical interface protective cap which can be securely connected to the terminal body to protect the optical fiber interface.

To protect the optical fiber interface, the protective cap includes a front end portion, a rear end portion, an upside portion, an underside portion, a right side portion and a left side portion. The front end portion has a wire outlet through which the optical fiber passes and the rear end portion has an opening to house the optical fiber splice. The left side portion has clamping parts to secure the protective cap to the terminal body. The front end portion, the rear end portion, the upside portion, the underside portion, the right side portion and the left side portion form a cavity in which the optical fiber and the optical fiber splice are connected.

When the protective cap is installed onto the terminal body, the cavity made from the front end portion, rear end portion, upside portion, underside portion, left side portion and right side portion protects the fiber splice and the fiber connector.

Another purpose of the invention is to expand the operating space for the fiber access interface.

To implement the aforementioned purpose, the fiber access interface terminal includes a terminal body and a protective cap, with the exposed terminal body providing an incision from which the optical fiber splice is exposed and the protective cap protecting the incision. The protective cap includes a front end portion, a rear end portion, an upside portion, an underside portion, a right side portion and a left side portion. The front end portion has a wire outlet through which the optical fiber passes, the rear end portion has an opening to house the optical fiber splice, and the left side portion has clamping parts to clamp the protective cap to the terminal body. The front end portion, the rear end portion, the upside portion, the underside portion, the right side portion and the left side portion form a cavity in which the optical fiber and the optical fiber splice are connected.

The optical fiber interface protective cap clamps on the terminal body by sliding the left side portion directly onto the clamps. The front end portion, rear end portion, the upside portion, the underside side portion, the right side portion and the left side portion provide walls with a cavity to house the optical fiber and the fiber optic connector, providing the optical interface protection. The terminal body doesn't have additional walls around the incision, such that with the optical fiber interface protective cap open or removed, the optical interface is completely exposed from the top, bottom, and right, allowing access to operate on the fiber interface.

DRAWINGS OVERVIEW

The specific features and attributes of the present invention are illustrated in the following drawings. In the Drawings, the specific feature label numbers are further ascribed different sub-levels of the same label numbers, as indicated in the Optical Fiber Access Terminal and Optical Fiber Interface Protective Cap Label Identification Chart. The Drawings and Label Identification Chart are attached.

THE BEST METHOD OF EMPLOYING THE PRESENT INVENTION

Figure 1:
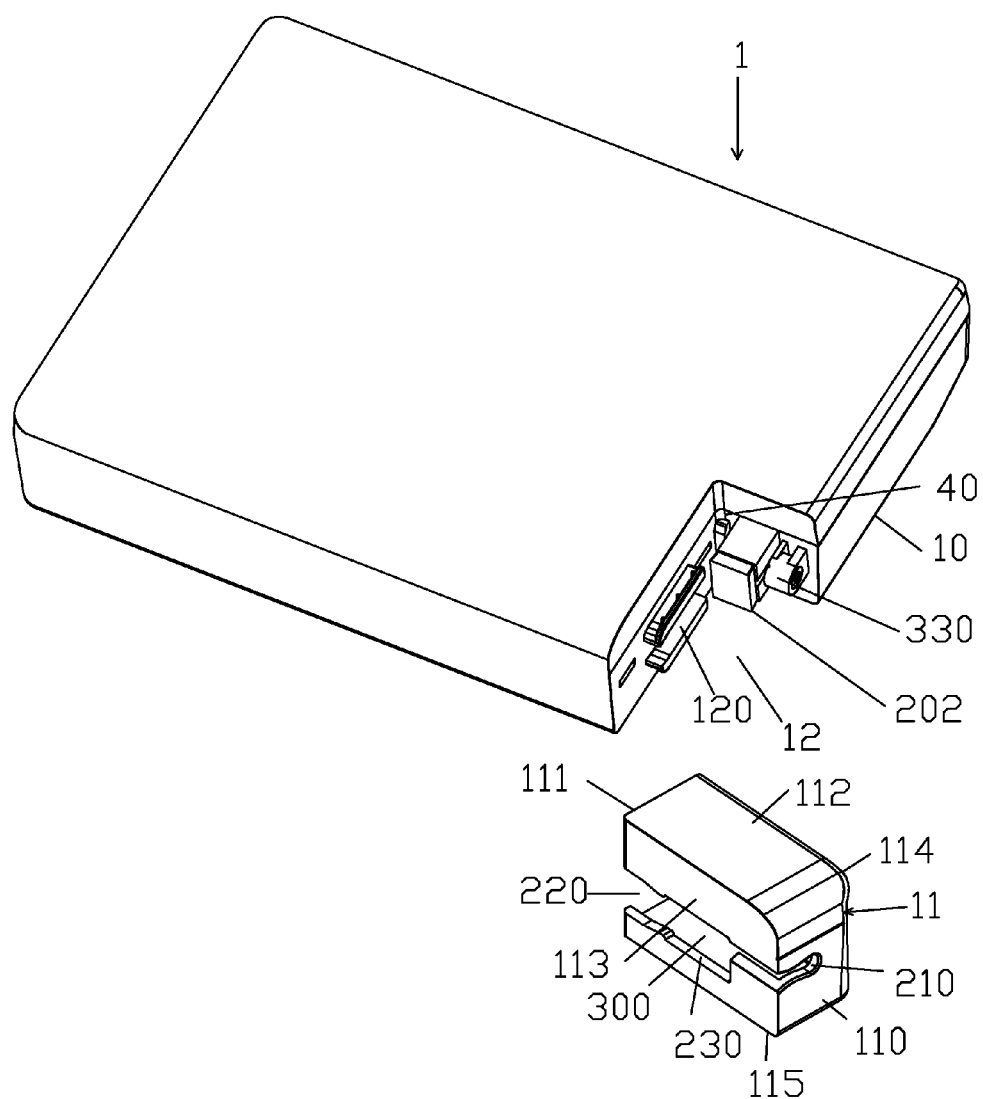
FIG. 1 is the schematic of the optical fiber access terminal and optical fiber interface protective cap.
Figure 2:
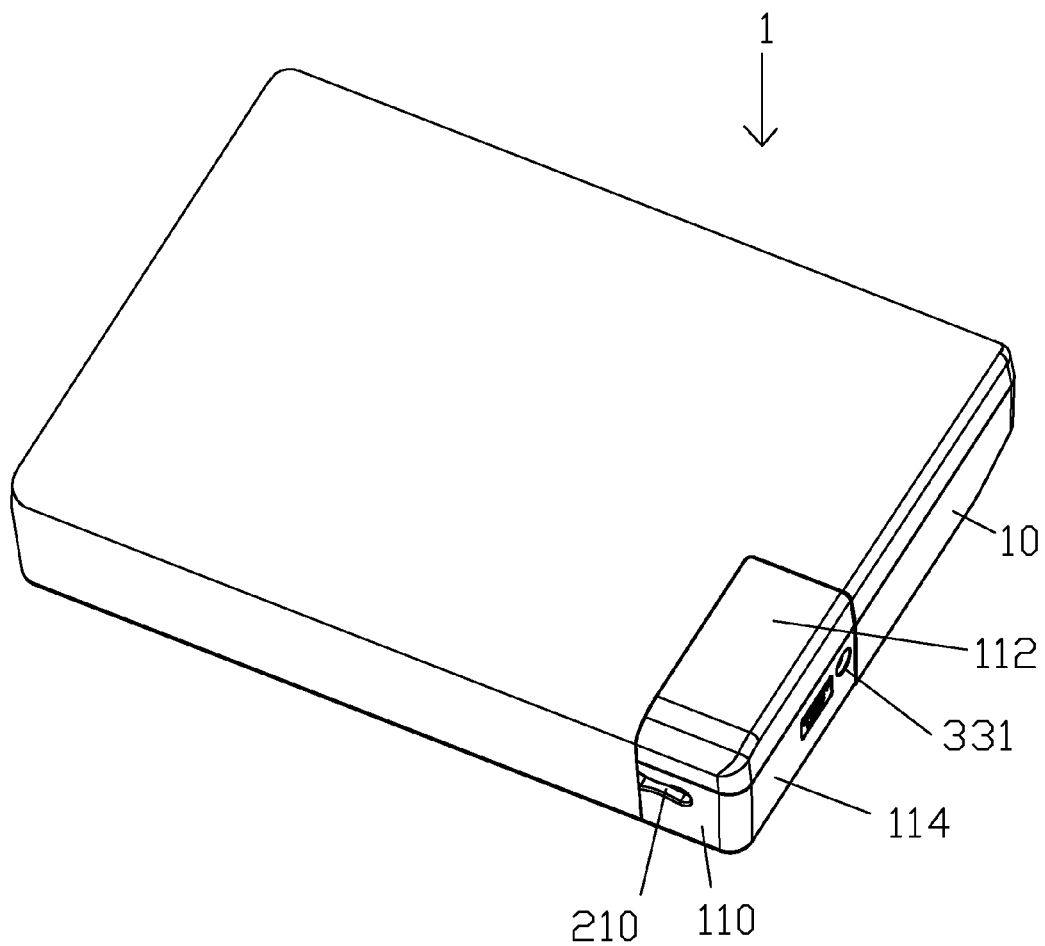
FIG. 2 is a three-dimensional view of the optical fiber access terminal.

In order to make the descriptions below easy to understand, the FIGS. 1-9 depict the invention which relates to the interface between an optical fiber access terminal and the optical fiber interface protective cap. In the following description, directional terms such as "up" and "under", "left", "right", "front", "rear" and other instructions are based on the optical fiber access terminal body when referring to the standard location indicated on the terminal body as shown in FIG. 2.

FIG. 1 to FIG. 7 shows the first embodiment of this invention.

FIG. 1 and FIG. 2 illustrate the optical fiber access terminal 1, including the terminal body 10 and a protective cap 11, with the terminal body 10 including the shell and the various optoelectronic devices contained in the shell. The optical fiber access terminal 1 can be a GPON, EPON, optical Ethernet or any other optical network terminal device. In the corner of the terminal body 10 is a square cut-out incision 12, with the incision 12 exposing the fiber optic splice 202. The protective cap 11 can be slid in and clamped onto the terminal body embodiments 10 to cover the incision 12, which protects the optical fiber splice 202.

The protective cap 11 includes a front end portion 110, a rear end portion 111, an upside portion 112, an underside portion 115, a left side portion 113 and a right side portion 114. The front end portion 110 has a wire outlet 210 to pass through an optical fiber and the rear end portion 111 has an opening 220 to house the optical fiber splice 202. The left side portion 113 slides onto the left side of the terminal body 10 (or the shell) using the clamping part slot 230 to attach it to the terminal body 10, as shown in the FIG. 1 embodiment. The front end portion 110, rear end portion 111, upside portion 112, underside portion 115, right side portion 114 and left side portion 113 forms a cavity 300. The optical fiber (not shown) is inserted through the front end section 110 and is located in the cavity 300 as it passes through to the optical fiber splice 202. As shown in FIG. 2, when the protective cap 11 and terminal body 10 are slid together, the protective cap 11 and terminal body 10 are flush to the outer surface. As can be seen from FIG. 1, the incision 12 provides space to install the fiber optic, allowing users space on the top, bottom or right side optical splice 202 to operate, which makes the fiber optic interface operation easier.

Figure 3:
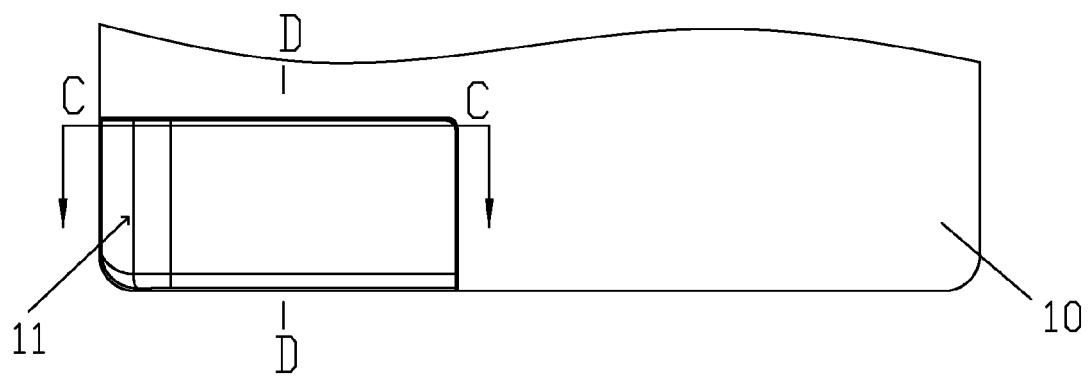
FIG. 3 is the top view of the optical fiber access terminal as shown in FIG. 2, depicting the optical fiber interface protective cap attached to the terminal.
Figure 4:
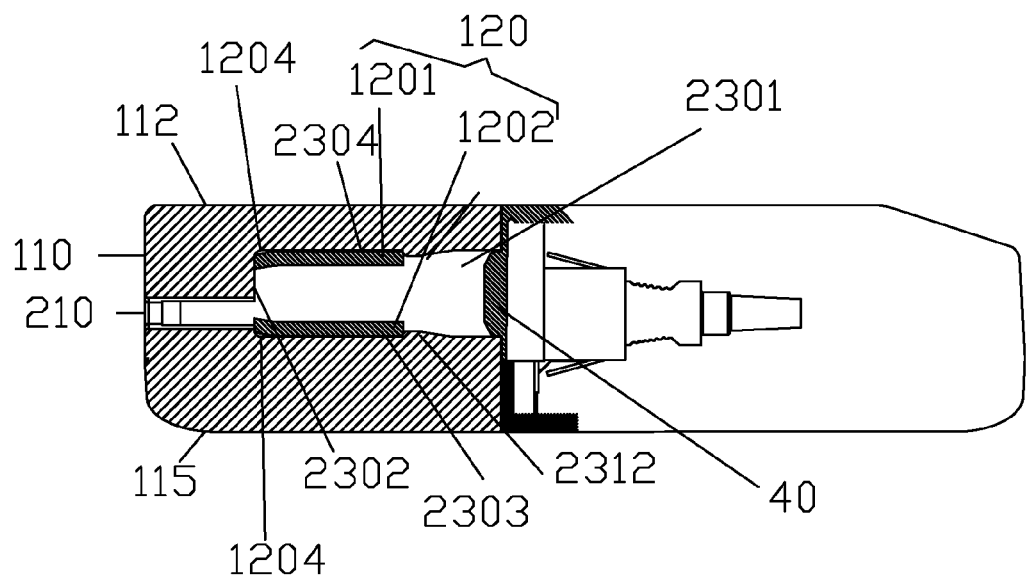
FIG. 4 is FIG. 3 detailing the C-C cross-section view.
Figure 5:
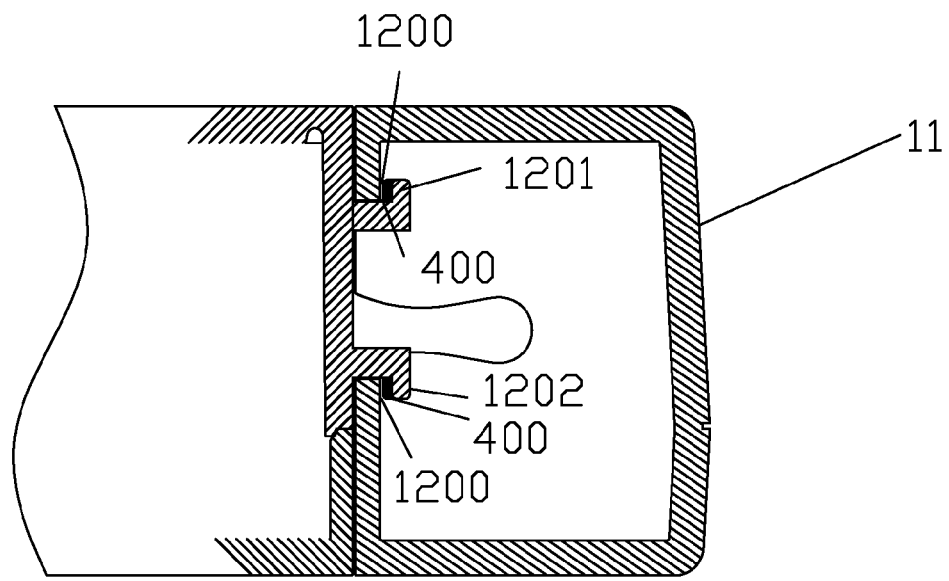
FIG. 5 is FIG. 3 detailing the D-D cross-section view.
Figure 8:
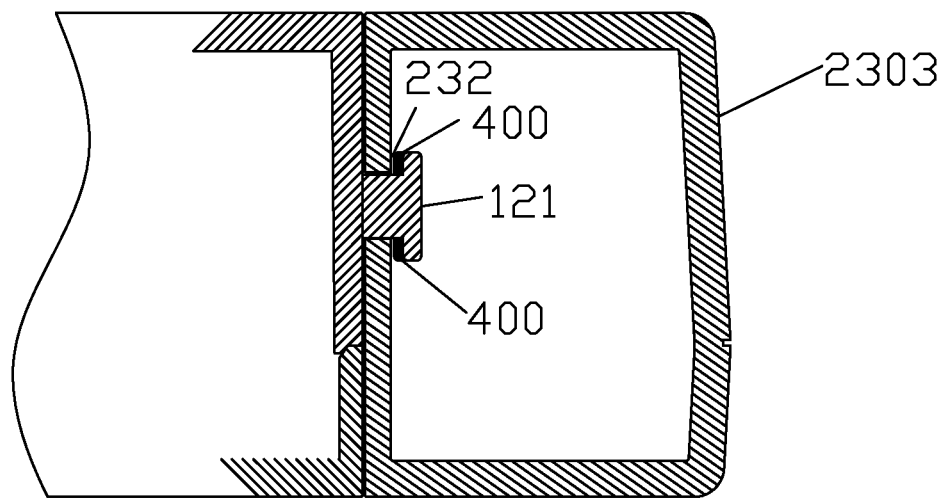
FIG. 8 illustrates the optical fiber interface protective cap and the optical fiber access terminal optical interface with a different type of embodiment.

Regarding FIG. 3, FIG. 4 and FIG. 5, the terminal body 10 incision 12 has clamping rails 120, which includes two separate rails, the upper rail 1201 and the lower rail 1202. As shown in FIG. 5, both rails 1201 and 1202 have rail grooves 1200. The two rails 1201 and 1202 can also be combined into one rail 121, as shown in FIG. 8, with the terminal body 10 having the single rail 121.

Figure 7:
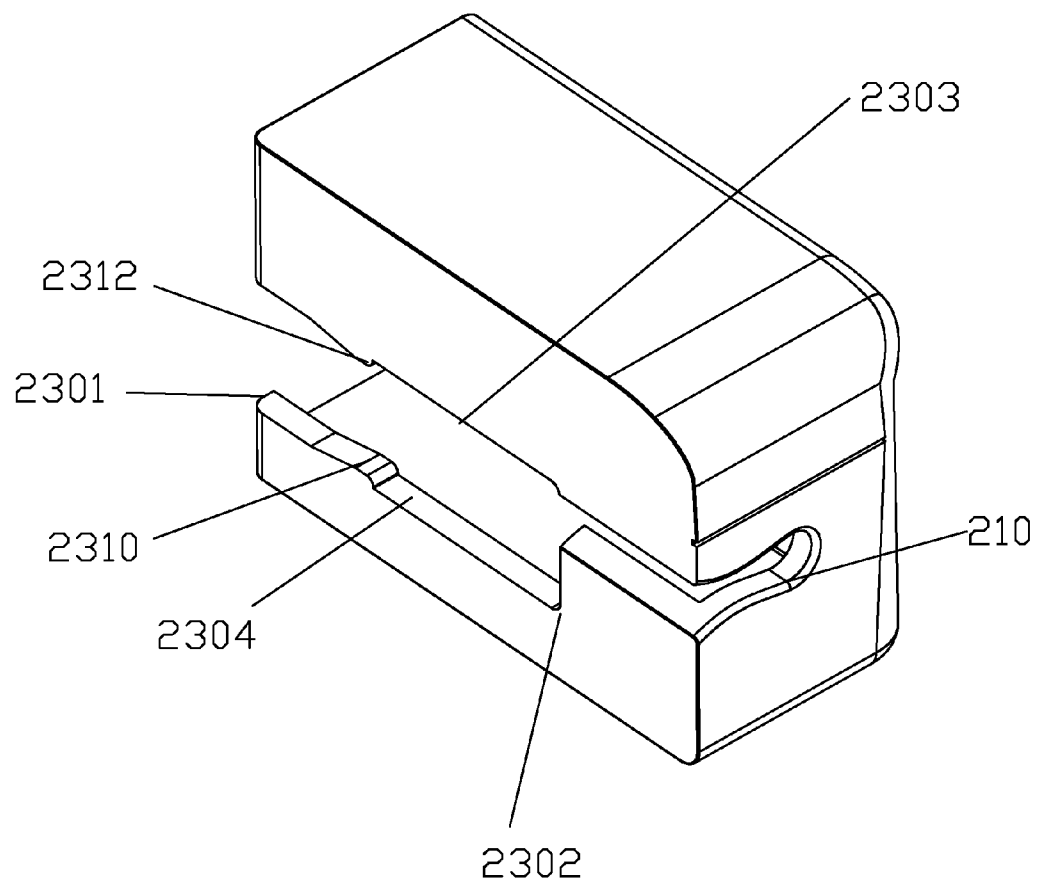
FIG. 7 is a three-dimensional schematic of the optical fiber interface protective cap.

As shown in FIG. 4 and FIG. 7, the protective cap 11 left side portion 113 clamping parts slot 230 has an open end 2301, a closed end 2302, and side edges 2303, 2304, with the side edges 2303, 2304 connected to both the open end edge 2301 and the closed end edge 2302. The clamping part slot's 230 side edge 2303 has a noticeable bulged protrusion 2312, with the side edge 2304 having a prominent raised protrusion 2310, with the opening end 2301 to the protrusions 2310, 2312 forming a guiding part, and the protrusions 2310, 2312 then forming the clamping part.

As per FIG. 1 and FIG. 5, both side edges 2303, 2304 of the clamping part slot 230 slide into the grooves 1200 by inserting the clamping part slot 230 onto the rails 120. As can be seen from FIGS. 4 and 7, the slot width is gradually reduced, which makes it easy to insert the clamping part slot's 230 side edges 2303, 2304 into the rails 120 and allows the clamping part slot 230 to slide uniformly onto the rail 120 as seen in FIG. 4. As the protrusions 2310, 2312 hit the rails 120, the user, with slight effort, pushes the protective cap 11 over the rails 120 past the protrusions 2310, 2312 toward the closed end 2302. At the protrusions 2310, 2312 the slot 230 expands by use of an elastic deformation, so when the protective cap 11 slides further onto the terminal body 10 rails 120, as can be seen from FIG. 4, the protective cap 11 protrusions 2310, 2312 drop in place past the rails 120 and are secured. With the slot 230 attached to the rail 120, the protective cap 11 is locked in place, as shown in FIG. 5, which prevents it from moving around. Also with the slot 230 and the rails 120 locked together, users cannot easily remove the protective cap 11 from the terminal body 10, but have to forcibly slide the protective cap 11 over the rails 120 which causes it to expand by elastic deformation.

In order to facilitate installing the protective cap 11 slot 230 and to allow it to easily slide over the front end of the rails 120, connecting the rails 120 and the slot 230, there is a curved outside edge guide 1204, as is shown in FIG. 4. This curved outside edge 1204 makes the rails' 120 entry point smooth, so even when the slot 230 hits the front of the rails 120 at the point of the protrusions 2312, 2310, the user need not take much effort to push the protective cap 11 to the terminal wall.

To further ensure the protective cap 11 and terminal body 10 are firmly attached, a threaded column 330 can also be installed in the terminal body 10 with a corresponding screw hole 331 set in the protective cap 11. When the protective cap 11 and terminal body 10 are attached, after aligning the column hole 331 to the column 330, a screw can be placed through the hole 331, which allows the protective cap 11 and terminal body 10 to be firmly secured together.

Figure 6:
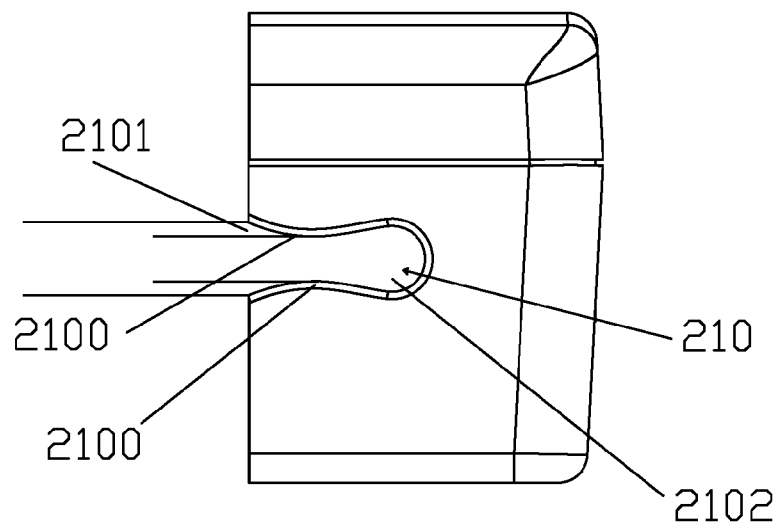
FIG. 6 is the optical fiber interface protective cap front end view.

As shown in FIG. 6 and FIG. 7, the protective cap 11 front end portion 110 outlet 210 walls 2100 are used to hold the protruding optical fiber, with fiber from the outlet 210 passing through the entrance 2101, squeezing through the narrowed section of the walls 2100 into the outlet 210 gap 2102, which aforementioned structure allows the fiber to be easily pushed into the fiber outlet 210 but does not easily allow the optical fiber to slide out of the outlet 210.

As shown in FIG. 1 and FIG. 4, the terminal body 10 also has a support bar 40 to the left of the fiber optic splice 202, so when the protective cap 11 and terminal body 10 are clamped together, the support bar 40 accommodates the protective cap 11 slot 230, supporting both sides of the slot 230, so as to prevent the hollow protective cap 11 from shifting, thereby destroying the fiber optic connection. With the support bar 40 inserted into the protective cap 11 it can also support the rear end 111 opening 220 and by supporting both sides of the opening 220, it can also prevent deformation of the protective cap 11, allowing it to be flush with the terminal body 10.

FIG. 8 shows a second embodiment of the invention. It has a different configuration of the rails 121 from that used in FIG. 5, as it has one solid rail 121 rather than two separate rails with a space between the two rails. Also the protective cap 11 slot 230 is correspondingly narrowed.

Figure 9:
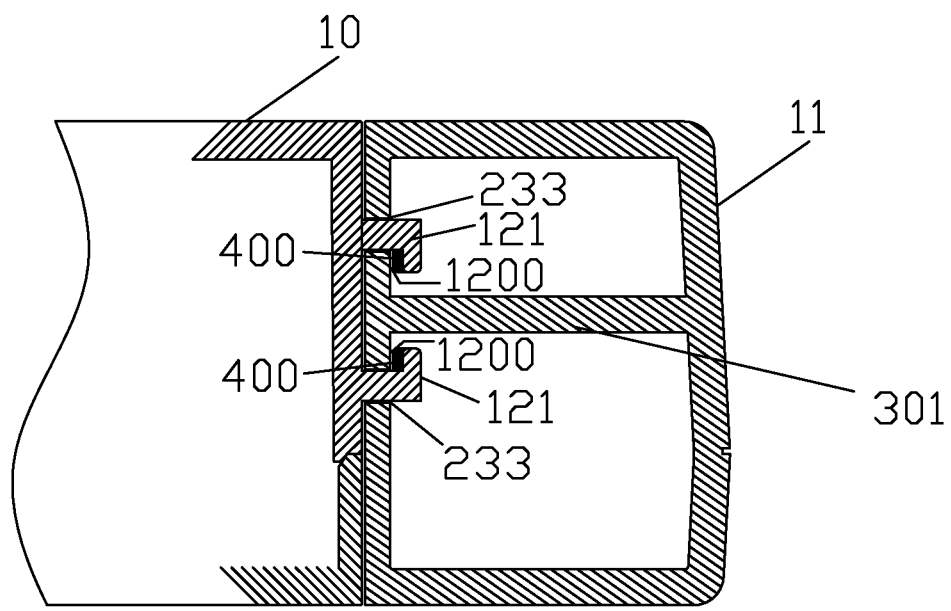
FIG. 9 illustrates the optical fiber interface protective cap and the optical fiber access terminal with yet another type of embodiment.

FIG. 9 shows the third embodiment of the invention. FIG. 9 is different from the illustration shown in FIG. 5 in the left side portion 113 of the protective cap 11 which has two slots 233 and, accordingly, the terminal body 10 provides two rails 121, with the rails 121 groove 1200 in a different inverted position. In order to provide two slots 233, the cavity 300 is split by a connecting wall 301.

See also FIG. 5, FIG. 8 and FIG. 9, in which the grooves in the rails have ribbing 400 that regulates the protective cap 11 as the slot is being elastically deformed by gripping both edges, which is used to maintain the width adjustment of the slot as the protrusions pass over the rails, so that the protective cap 11 slot 230 slides evenly over the rails and then is secured.

Optical Fiber Access Terminal and Its Optical Fiber Interface Protective Cap Label Identification Chart
1 Optical Fiber Access Terminal
10 Terminal Body
11 Protective Cap
110 Protective Cap Front End Portion
111 Protective Cap Rear End Portion
112 Protective Cap Upside Portion
113 Protective Cap Left Side Portion
114 Protective Cap Right Side Portion
115 Protective Cap Underside Portion
12 Terminal Box Incision
120 Terminal Box Clamping Rails
1200 Terminal Box Clamping Rails Groove
1201 Terminal Box Clamping Upper Rail
1202 Terminal Box Clamping Lower Rail
1204 Terminal Box Clamping Rail Outside Edge Guide 121 Terminal Box Clamping Rails
202 Optical Fiber Splice
210 Protective Cap Wire Outlet
2100 Protective Cap Wire Outlet Walls
2101 Protective Cap Wire Outlet Entrance
2102 Protective Cap Wire Outlet Gap
220 Protective Cap Opening
230 Protective Cap Clamping Part Slot
2301 Protective Cap Clamping Part Open End
2302 Protective Cap Clamping Part Closed End
2303 Protective Cap Clamping Part Side Edge
2304 Protective Cap Clamping Part Side Edge
2310 Protective Cap Clamping Part Raised Protrusion
2312 Protective Cap Clamping Part Bulged Protrusion
232 Protective Cap Clamping Part Slot
233 Protective Cap Clamping Part Slot
300 Protective Cap Cavity
301 Protective Cap Connecting Wall
330 Terminal Box Protective Cap Threaded Column
331 Protective Cap Screw Hole
40 Terminal Box Incision Backstop Support Bar
400 Terminal Box Glide Rail Ribs

The invention claimed is:

1. A kind of optical interface fiber access terminal protective cap, including: a front end portion with an outlet to allow an optical fiber to pass through; a rear end portion, with an opening to house an optical connector; an upside portion; an underside portion; a right side portion; and a left side portion used to clamp onto a fiber access terminal shell; with the front end portion, the portion rear end portion, the upside portion, the underside portion, the right side portion and the left side portion forming a cavity around the fiber and the fiber optic connector which are connected within the cavity;

wherein there is at least one clamping part slot and a clamping portion with rails for each clamping part slot on the shell;

wherein there is a clamping part slot with an open end and a closed end that are connected at the edges, with each side of the clamping part slot having a mid-point protrusion; and when the open-ended portion of the clamping part slot is inserted into the rail, the protrusion is guided onto the rail of the clamping part slot mentioned above, with the protrusion clamping onto the end section of the rail between the protrusion and the closed end.

2. The optical interface fiber access terminal protective cap, as described in claim 1, wherein the right side portion has a hole for a screw to pass through.

3. The optical interface fiber access terminal protective cap, as described in claim 1, which holds within the outlet, fiber inserted through the narrowed walls.

4. A kind of optical fiber access terminal, including a terminal body and a protective cap, which exposes the terminal to provide an incision for a fiber optic connector, with the protective cap protecting the incision, and the protective cap including: a front end portion with an outlet to allow an optical fiber to pass through; a rear end portion, with an opening to house an optical connector; an upside portion; an underside portion; a right side portion; and a left side portion used to clamp onto the terminal body; with the front end portion, the portion rear end portion, the upside portion, the underside portion, the right side portion and the left side portion forming a cavity around the fiber and the fiber optic connector which are connected within the cavity;

wherein the said protective cap includes at least one clamping part slot, with the terminal body providing at least one incision with clamps for the clamping part slot;

wherein there is a clamping part slot with an open end and a closed end that are connected at the edges, with each side of the clamping part slot having a mid-point protrusion; and when the open-ended portion of the clamping part slot is inserted into the rail, the protrusion is guided onto the rail mentioned above, with the protrusion clamping onto the end section of the rail between the protrusion and the closed end.

5. The optical fiber access terminal, as described in claim 4, wherein at least one rail provides a groove, and as described, at least one side of the clamping part slot is able to be slid into the rail groove entryway.

6. The optical fiber access terminal, as described in claim 4, wherein when the clamping part slot comes into contact with the outside edge guide, the outside edge guide guides the clamping part slot, which is wider to accommodate the entry, smoothly into the rail groove.

7. The optical fiber access terminal, as described in claim 4, wherein the cap includes a clamping rail slot, the terminal body provides a rail, the rail is split into two parts, each part having rail grooves, and as described, each side of the clamping part slot is able to be placed in the outside edge guide entryway.

8. The optical fiber access terminal, as described in claim 5, wherein the cap includes a clamping part slot which, when placed in the groove, uses the described ribbing so the elastic deformation can be regulated.

9. The optical fiber access terminal, as described in claim 4, wherein the terminal body provides support to the protective cap within the incision in the section above a support bar by securing the open end of the clamping part slot at the terminal wall, which prevents deformation of the protective cap.

10. The optical fiber access terminal, as described in claim 4, wherein the terminal body provides support to the protective cap within the incision in the section above a support bar by securing the rear end of the clamping part slot at the terminal wall, which prevents deformation of the protective cap.

11. A kind of optical terminal, including a terminal body and a protective cap, which exposes the terminal to provide an incision for a fiber optic connector, with the protective cap protecting the incision, and the protective cap including: a front end portion with an outlet to allow an optical fiber to pass through; a rear end portion, with an opening to house an optical connector; an upside portion; an underside portion; a right side portion; and a left side portion used to clamp onto the terminal body; with the front end portion, the portion rear end portion, the upside portion, the underside portion, the right side portion and the left side portion forming a cavity around the fiber and the fiber optic connector which are connected within the cavity, wherein the protective cap has a hole on the right side portion, the terminal body has a connecting column within the incision, the column provides a threaded hole connection for a screw to pass through the hole and connect the right side portion to the threaded screw hole, thus making a fixed connection between the protective cap and the terminal body.

12. The optical fiber access terminal, as described in claim 4, which holds within the above mentioned outlet, fiber inserted from the entrance of the outlet.

* * * * *